(No Model.)
J. H. KELLER.
Device for Removing Sediment from Cisterns.
No. 240,908.         Patented May 3, 1881.
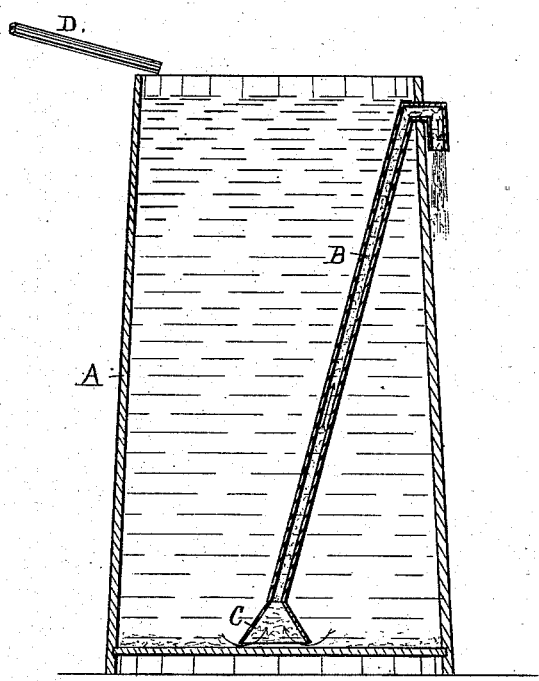

UNITED STATES PATENT OFFICE.

JOHN H. KELLER, OF NEW ORLEANS, LOUISIANA.

DEVICE FOR REMOVING SEDIMENT FROM CISTERNS.

SPECIFICATION forming part of Letters Patent No. 240,908, dated May 3, 1881.

Application filed May 24, 1880. (No model.)

*To all whom it may concern:*

Be it known that I, JOHN H. KELLER, a resident of the city of New Orleans, parish of Orleans, and State of Louisiana, have invented a certain new and useful Improvement in Devices for Removing Sediment from Cisterns; and I do hereby declare the following to be a full, clear, and correct description of the same, reference being had to the annexed drawing, making a part of this specification.

This invention presents a means whereby the inflow of water from the roofs of buildings or elsewhere is employed for the purpose of driving the accumulations of dirt, &c., from cisterns or reservoirs, whether the same be located above or below ground.

My object is to preserve for the use of consumers nothing but the cleanliest of water, thus removing, to a certain extent, the cause of disease so prevalent in countries wherein the inhabitants are compelled by force of circumstances to store water for future use.

My invention consists in the combination, with a cistern, of a tube or pipe having its lower end arranged near the bottom of the cistern and its upper end near the top of the cistern and extending outside of the same.

My invention also consists in the combination, with a cistern, of a pipe having at its lower end a funnel arranged near the bottom of the cistern and its upper end curved and located near the upper end of the cistern and extending outside of the same, as will be hereinafter more fully set forth.

A represents an ordinary cistern. In this I secure, at any desired incline, a pipe, B, having a funnel-shaped mouth, C, that is held at a distance of an inch and a half (more or less) from the bottom of the cistern, as shown. The upper portion of the pipe is provided with an elbow or curve and passes outward through the receptacle at a point of about one or more inches below the top thereof. The outer end of this pipe may be inclined at any angle and in any direction other than an upward one.

The operation is as follows: The water from roofs of buildings or elsewhere passes through conduit D into the cistern or reservoir. When it reaches a height greater than that of the upper end of the pipe B it naturally passes out through the same. The discharge, however, being from the bottom of the cistern, carries with it all sediment or foreign matter gathered around the mouth of the funnel C. When the water ceases to flow through this pipe the remaining sediment gradually seeks its level, in this way bringing more material to the mouth of the funnel ready to be carried off by the next overflow.

Having described my invention, what I claim as new, and desire to secure by Letters Patent, is—

1. The combination, with a cistern, of a pipe having its lower end arranged near the bottom of the cistern and its upper end near the top of the cistern and extending outside of the same, substantially as described.

2. In combination with a cistern, a pipe having at its lower end a funnel arranged near the bottom of the cistern and its upper end curved and located near the upper end of the cistern and extending outside of the same, substantially as shown and described.

In testimony whereof I have hereunto signed my name.

J. H. KELLER.

In presence of—
J. C. HUBBELL,
P. J. FINNEY.